United States Patent
Wack et al.

(10) Patent No.: US 6,733,201 B2
(45) Date of Patent: May 11, 2004

(54) PLUG CONNECTION WITH INSTALLATION SECURING DEVICE

(75) Inventors: Axel Wack, Einbeck (DE); Andreas Waldow, Einbeck (DE); Dirk Brucke, Krbiensen (DE)

(73) Assignee: Teleflex Automotive Germany GmbH, Dassel (DE)

(*) Notice: Subject to any disclaimer, the term of this patent is extended or adjusted under 35 U.S.C. 154(b) by 9 days.

(21) Appl. No.: 10/167,569

(22) Filed: Jun. 12, 2002

(65) Prior Publication Data

US 2002/0192019 A1 Dec. 19, 2002

(30) Foreign Application Priority Data

Jun. 15, 2001 (DE) ..................................... 201 09 952 U

(51) Int. Cl.[7] ................................................. B25G 3/00
(52) U.S. Cl. ...................... 403/315; 403/316; 403/317; 403/318; 403/325; 403/327; 403/DIG. 4
(58) Field of Search .................. 403/326, 327, 403/328, 329, 360, 397, 408.1, DIG. 4, DIG. 7, 321, 325, 316, 317, 318, 319, 315; 411/522, 523, 524, 529, 530

(56) References Cited

U.S. PATENT DOCUMENTS 5,131,785 A * 7/1992 Shimazaki .................. 403/326
5,852,861 A * 12/1998 Cunningham et al.

* cited by examiner

*Primary Examiner*—Lynne H. Browne
*Assistant Examiner*—Victor MacArthur
(74) *Attorney, Agent, or Firm*—Collard & Roe, P.C.

(57) ABSTRACT

A plug connection with an installation securing device for cable lines comprises a sleeve with a central cylindrical cavity that is open at one end. A primary groove is open to the outer surface of the sleeve and the central cylindrical cavity. A wedge-shaped barrier that is integrally formed with the sleeve is disposed in the primary groove. A bolt is disposed in the central cylindrical cavity and it has a secondary groove that extends around its entire circumference. The secondary groove aligns with said primary groove when said bolt is fully inserted in said sleeve. A U-shaped spring is disposed in the primary groove holding the bolt in place by engaging the secondary groove via said primary groove. The U-shaped spring has hook-shaped ends that engage a wedge-shaped barrier, holding said U-shaped spring in place and thus said bolt in said sleeve.

4 Claims, 2 Drawing Sheets

PLUG CONNECTION WITH INSTALLATION SECURING DEVICE

BACKGROUND

The invention relates to an installation securing device for cable lines (or tackle). The device is applied to the bolts of a reversing device. The invention may be used wherever cable lines are connected with bolts, for example in motor vehicles. When motor vehicles are assembled, the cable lines of clutches, brakes, accelerator pedals, and other components are connected with bolts. It is important for there to be no confusion between those components connected in close proximity. These parts must be connected in a clear, quick, and safe way. These requirements must also be satisfied when parts are disengaged for repairs. The assembly process should be simple, without tools, and with minimal required force. The development of noise resulting from play in the plug connection should also be avoided. Finally, the connection should be made so that no unintentional disengagement is possible.

The conventional plug connections are form-locked adaptations that are connected with great installation force. The highest possible disengagement forces are desired. Spherical cups or cylindrical bushes are conventionally used in these connections. The cylindrical bushes are generally fused or swaged to the cable. Cylindrical bushes are then secured by additional securing disks that prevent the form-locked connection from disengaging. This requires additional handling by the assembler after the bushes have been mounted.

The present invention provides a plug connection having an installation securing device that can be installed and dismantled with low force and without tools. The aim of the invention is to make the installation process simple and to avoid any play (or clearance) between the components that may lead to noise in the vehicle.

SUMMARY

The plug connection with the installation securing device for cable lines has a sleeve containing the securing device and the bolt. The sleeve may be plastic, making it easier to handle for the installer (or assembler). Both the sleeve and the bolt are connected to a primary spring. The primary spring is preferably U-shaped and made of steel. It has an opening with two ends opposite the U-shaped component. The ends are formed in the shape of an eye, or as hook-shaped structures that engage a wedge-shaped barrier.

The sleeve has a primary groove into which the U-shaped spring fits. The wedge-shaped barrier, having an opening gradient from the center of the sleeve, is disposed on one side of the primary groove. The bolt, onto which the sleeve is pushed, has a groove extending around its circumference. The width of this groove approximately corresponds with the width of the U-shaped spring. The inside diameter of the sleeve and the diameter of the bolt are also fitted. If different cable lines have to be connected, each pair of sleeves and bolts will have different diameters so that any incorrect connection of components is excluded.

At its upper end, the bolt has a milled phase or tapering, so that it can be easily inserted in the sleeve. In the installed condition, the sleeve is always provided with the U-shaped spring having its ends coupled to the wedge-shaped barrier of the sleeve.

When the sleeve is mounted, it is pressed onto the bolt until the U-shaped spring, disposed in the primary groove of the sleeve, locks into the secondary groove extending around the bolt, forming a form-locked joint. In order to produce a connection between the bolt and the sleeve that is free of play, a secondary spring is disposed on the bottom of the sleeve for clamping the sleeve against the bolt. This prevents the components from rattling or vibrating.

The bolt and the springs of the sleeve are made of metal, preferably steel. The bolt may be fused or swaged to the cable. It is advantageous if a plastic is used for the sleeve, preferably a plastic that can be produced by the injection molding process.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
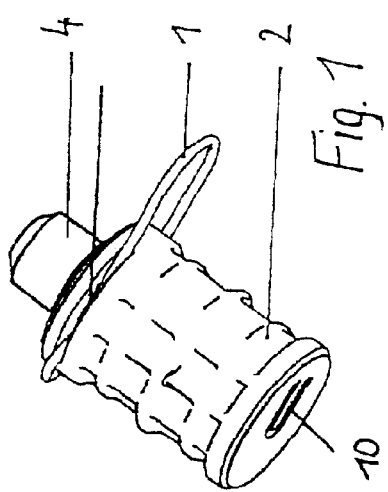
FIG. 1 shows a perspective view of the plug connection from the bottom.

Referring now in detail to the drawings, FIG. 1 shows a sleeve 2 in the form of a cylinder, which has a primary groove 5 for a U-shaped spring 1, into which a bolt 4 is plugged. A secondary spring 10 is arranged on the underside of sleeve 2, which clamps sleeve 2 against bolt 4. At its upper end, bolt 4 has a milled phase or tapering, so that it can be easily inserted in sleeve 2. Bolt 4 is fused or swaged to a cable line.

Figure 2:
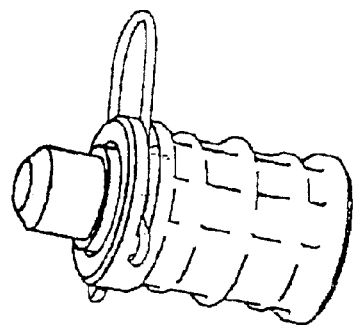
FIG. 2 shows a perspective view of the plug connection from the side.

FIG. 2 shows that bolt 4 has a diameter that is larger in the area of sleeve 2 than in the other areas.

Figure 4:
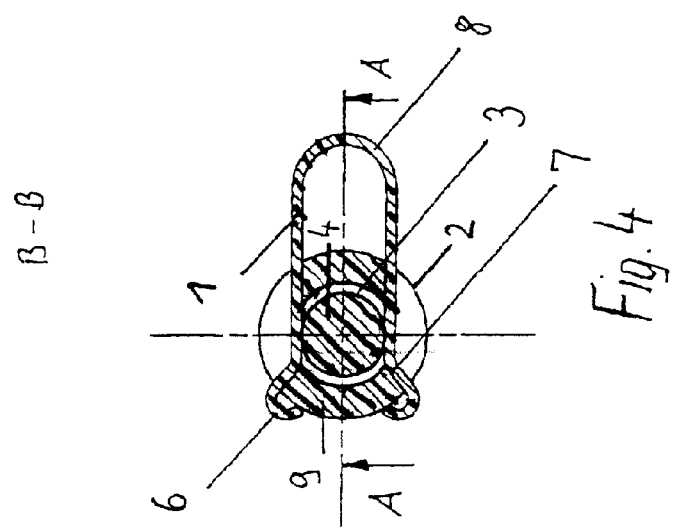
FIG. 4 shows a top view of the section B—B through the plug connection of FIG. 3.
Figure 3:
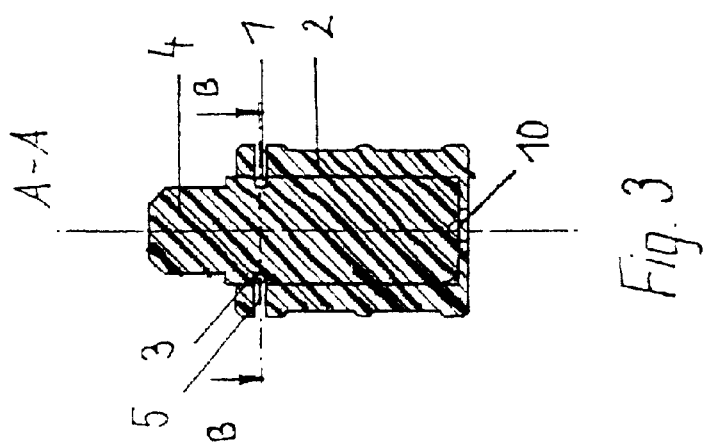
FIG. 3 shows a side view of the section A—A through the plug connection of FIG. 4.
Figure 8:
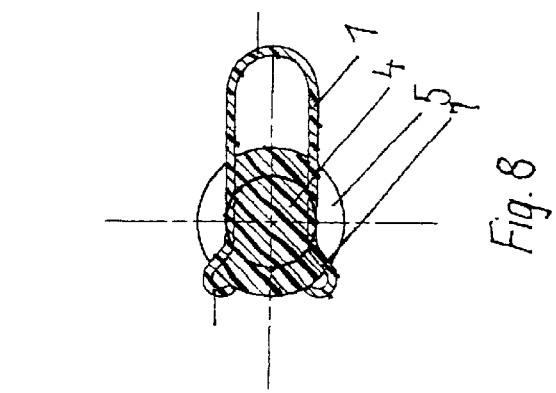
FIGS. 5 to 8 are sectional views of plug connections with different diameters of the bolt.

FIG. 3 shows a side view of the section A—A in FIG. 4, where spring 1 of sleeve 2 is locked into a secondary groove 3 of bolt 4, so that secondary groove 3 corresponds with primary groove 5 of sleeve 2. Secondary spring 10 clamps sleeve 2 against bolt 4.

Figure 7:
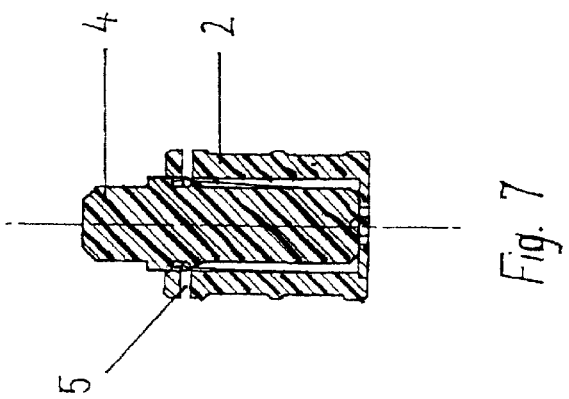
Figure 6:
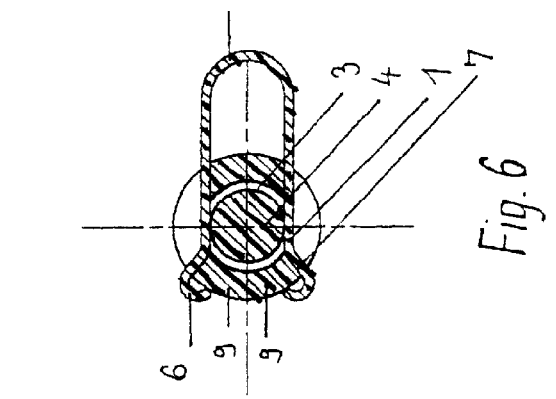
Figure 5:
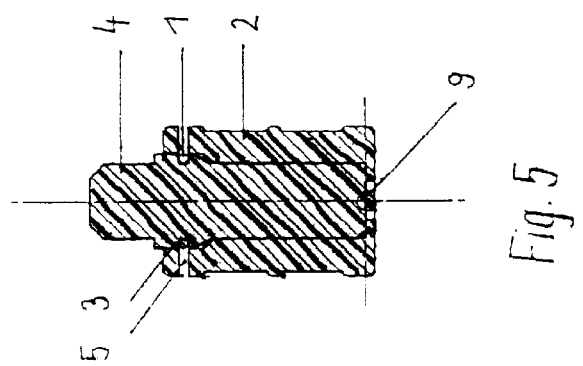

The section B—B in FIG. 3, which is shown in FIG. 4, shows the various areas of spring 1 in which sleeve 2 is clamped. Two ends 6 are arranged opposite a U-shaped end 8 of U-shaped spring 1. In the form-locked position of bolt 4 and sleeve 2, ends 6 are hooked on a wedge-shaped barrier 9 of sleeve 2. Wedge-shaped barrier 9 has two opening gradients 7 in primary groove 5. This connection prevents U-shaped spring 1 from being pulled off. The radius of end 6 is adequately large that U-shaped spring 1 cannot be released from wedge-shaped barrier 9, when bolt 4 is inserted and the larger bolt diameter holds U-shaped spring 1 open until it locks into secondary groove 3 of bolt 4. This can be effected also by changing the bolt diameter as shown by way of example in FIGS. 5 and 7.

The connection between bolt 4 and sleeve 2 can be locked in a simple manner by simply pressing sleeve 2 onto bolt 4, whereby U-shaped spring 1 is slightly opened, but retained in primary groove 5 of sleeve 2. After bolt 4 has been pressed into secondary spring 10 of sleeve 2, U-shaped spring 1 locks into secondary groove 3 of bolt 4. This creates a form-locked connection between bolt 4 and sleeve 2 that is free of play and does not generate any noise. To release this connection, U-shaped spring 1 is pressed in the direction of wedge-shaped barrier 9, opening U-shaped spring 1, so that sleeve 2 can be pulled from bolt 4.

This plug connection with an installation securing device requires no tools, and can be attached and detached with little installation force.

Accordingly, while only one embodiment of the present invention has been shown and described, it is obvious that many changes and modifications may be made thereunto without departing from the spirit and scope of the invention.

What is claimed is:

1. A plug connection with an installation securing device for connection to a cable line comprising:
    a sleeve (2) having a first end, a second end, and an outer surface, wherein said sleeve has a central cylindrical cavity that is open at said first end;
    a primary groove (5) disposed near said first end of said sleeve, wherein said primary groove is open to said outer surface and said central cylindrical cavity;
    a wedge-shaped barrier disposed in said primary groove, wherein said wedge-shaped barrier is integrally formed with said sleeve and has two walls that extend through said primary groove, and wherein said two walls are disposed so that said wedge-shaped barrier opens outwardly from said central cylindrical cavity of said sleeve;
    a bolt for connection to a cable line, disposed in said central cylindrical cavity of said sleeve, wherein said bolt has a secondary groove that extends around an entire circumference of said bolt, and wherein said secondary groove aligns with said primary groove when said bolt is fully inserted in said sleeve; and
    a U-shaped spring (1) having two free ends, wherein said two free ends of said U-shaped spring are hook-shaped;
    wherein said U-shaped spring is disposed in said primary groove and said U-shaped spring holds said bolt by engaging said secondary groove via said primary groove;
    wherein said hooked-shaped ends of said U-shaped spring engage said wedge-shaped barrier, holding said U-shaped spring in place and thus said bolt in said sleeve; and
    wherein said bolt is removed from said sleeve by pressing said spring in a direction of said wedge-shaped barrier to open said spring so that said bolt can be pulled from said sleeve.

2. The plug connection according to claim 1, further comprising a secondary spring at said second end of said sleeve, wherein said secondary spring acts against said bolt, preventing movement when said U-shaped spring engages said bolt.

3. The plug connection according to claim 1, wherein said sleeve is made of plastic.

4. The plug connection according to claim 1, wherein said bolt has an upper end that is tapered, allowing for simple insertion of said bolt into said sleeve.

* * * * *

UNITED STATES PATENT AND TRADEMARK OFFICE
CERTIFICATE OF CORRECTION

PATENT NO. : 6,733,201 B2
DATED : May 11, 2004
INVENTOR(S) : Wack et al.

It is certified that error appears in the above-identified patent and that said Letters Patent is hereby corrected as shown below:

Title page,
Item [75], Inventors, change "Krbiensen (DE)", to read -- Kreiensen (DE) --.

Signed and Sealed this

Twenty-seventh Day of July, 2004

JON W. DUDAS
*Acting Director of the United States Patent and Trademark Office*